United States Patent [19]

von Benda

[11] 4,145,482

[45] Mar. 20, 1979

[54] GALVANIC CELL HAVING RECHARGEABLE ZINC ELECTRODE

[75] Inventor: Klaus von Benda, Kemnat, Fed. Rep. of Germany

[73] Assignee: Firma Deutsche Automobilgesellschaft mbH, Fed. Rep. of Germany

[21] Appl. No.: 784,809

[22] Filed: Apr. 5, 1977

Related U.S. Application Data

[63] Continuation of Ser. No. 576,023, May 9, 1975, abandoned, which is a continuation of Ser. No. 375,818, Jul. 2, 1973, abandoned.

[30] Foreign Application Priority Data

Jun. 30, 1972 [DE] Fed. Rep. of Germany ....... 2232055

[51] Int. Cl.$^2$ .............................................. H01M 4/00
[52] U.S. Cl. ...................... 429/27; 429/206; 429/229; 429/249
[58] Field of Search ..................... 429/27–29, 429/229–231, 249, 253, 254, 206

[56] References Cited

U.S. PATENT DOCUMENTS

| | | | |
|---|---|---|---|
| 2,903,497 | 9/1959 | Comanor | 429/145 |
| 3,069,486 | 12/1962 | Solomon et al. | 429/229 |
| 3,201,281 | 8/1965 | Solomon et al. | 429/231 X |
| 3,424,617 | 1/1969 | Grieger et al. | 429/58 |
| 3,497,387 | 2/1970 | Amiet | 429/229 X |
| 3,516,862 | 6/1970 | Van der Grinten | 429/229 X |
| 3,592,693 | 7/1971 | Rosansky | 429/28 |
| 3,639,173 | 2/1972 | Stachursky | 429/61 X |
| 3,876,470 | 4/1975 | McBreen | 429/229 |

*Primary Examiner*—Charles F. LeFevour
*Attorney, Agent, or Firm*—Craig & Antonelli

[57] ABSTRACT

A galvanic cell comprising at least one rechargeable zinc electrode as anode, at least one other electrode as cathode, an electrolyte, and at least one foraminous electrically conductive auxiliary structure interposed between every anode and cathode. The auxiliary structure is galvanically separated from the electrodes of the cell and macroscopically visible electrolyte zinc deposition from the cell electrolyte thereon is only observed at potentials which are more negative than on a smooth nickel structure.

34 Claims, 2 Drawing Figures

GALVANIC CELL HAVING RECHARGEABLE ZINC ELECTRODE

CROSS-REFERENCE TO RELATED APPLICATIONS

This application is a continuation of application Ser. No. 576,023 filed May 9, 1975 now abandoned, which application is a continuation of application Ser. No. 375,818 filed July 2, 1973, and now abandoned.

This invention relates to a galvanic cell having a rechargeable zinc electrode.

In conventional galvanic cells having rechargeable zinc electrodes, which can include, for example, zinc-/air, zinc/silver oxide, or zinc/nickel oxide electrodes, the lifetime of the cell is undesirably limited by internal short circuits. These short circuits are produced during the charging of the cell due to the fact that the zinc from the electrolyte is not uniformly deposited on the anode. The deposit of zinc increases at preferred locations at a relatively high speed in the direction toward the cathode. The cause of this is to be seen in the depletion of zinc ion from the electrolyte with progressive charging. The depletion of the electrolyte in zinc ions leads to the formation of particularly rapidly growing zinc dendrites and, in certain cases, due to differences in concentration, to convex bulges of the electrode which, just as the dendrites, result in an internal short-circuiting of the cell after a few cycles.

Attempts have been made to avoid this short-circuiting by the use of separators. The conventional separators can be grouped, according to their mode of operation, into those which are to prevent mechanically a penetration of the zinc deposits to the cathode and furthermore into those which effect a precipitation of the zinc ions in the form of zinc compounds insoluble in the electrolyte. However, mechanically effective dendrite barriers do not prolong the lifetime of the cell to a substantial degree, inasmuch as the dendrites can grow through the separator. Therefore, efforts have been expended, in turn, to construct this type of separator in such a way that the diffusion of the zinc ions through the separator is made difficult. This, however, requires a high internal resistance of the separators due to the necessary smallness of the pores formed therein.

The chemically effective barriers are based on the precipitation of the zinc ions by alkaline earth hydroxides in the form of alkaline earth zincates. However, this type of separator, due to the solubility of the solid phases, demands the use of relatively dilute electrolyte liquor, connected, in turn, with an undesirably high internal resistance of the cell. Also, an excess of alkaline earth hydroxide is required for the quantitative precipitation of the zincate in a limited reaction zone, having a disadvantageous effect on weight and volume of the cell.

Another type of separator provides that the zinc dendrites are removed by oxidation with oxygen dissolved in the electrolyte. In order to accomplish this, the separator must have electro-catalytic properties for the oxygen reduction. Therefore, carbon felts or thinly silver-plated carbon felts are suggested preferably as catalytic materials for such separators. However, due to the low solubility of oxygen in alkaline solutions, only very low charging current densities are possible, at which densities the dendrite growth is suppressed; anyway.

A further type of separator provides a combination of diffusion-inhibiting diaphragms with electrolyte-absorbing fibrous mats and a layer of sintered nickel which is microporous and — which is essential — partially rendered hydrophobic. This arrangement represents, on the one hand, a mechanical dendrite barrier and, on the other hand, serves the purpose of exploiting the ignoble character of the zinc which, as is known, is dissolved upon contact with metals of small hydrogen overvoltage in strong electrolytes in accordance with:

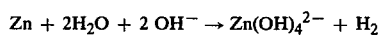

$$Zn + 2H_2O + 2\,OH^- \rightarrow Zn(OH)_4^{2-} + H_2$$

with hydrogen evolution. The feature of rendering the sintered nickel layer hydrophobic serves the purpose of making it difficult for the zinc ions to be adsorbed, which adsorption precedes the disposition of the metallic zinc.

The disadvantages of this separator system reside, in particular, in its complicated multiple-layer construction of microporous materials, thus causing an undesirably high internal resistance of the cell. If dendrites come into contact with the sintered nickel layer in spite of the diffusion-inhibiting diaphragms, a dissolution of the dendrites can be accomplished only under hydrogen evolution. In accordance with the above reaction scheme, two hydrogen molecules are produced in this process for each dissolved zinc atom. The thus-produced gaseous hydrogen, of necessity, increases the internal resistance furthermore vigorously in the pores of the sintered nickel layer and can only be removed gradually, due to the structure of the separator system, which, in turn, means a limitation to low charging current densities. Moreover, a disadvantageous consequence of rendering the sintered nickel hydrophobic is that the reaction according to the above equation and thus the evolution of hydrogen take place only to a subordinate extent.

It is an object of this invention to provide a galvanic cell of a simple construction with a rechargeable zinc electrode, which, by exhibiting a low internal resistance, permits comparatively high charging and discharging current densities, and has a capacity and degree of charging efficiency that remain substantially constant over a large number of cycles. This object is attained, according to this invention, by providing that the zinc electrode is surrounded, in an at least partial manner, by at least one foraminous, electrically conductive auxiliary structure or means, galvanically separated from the electrodes of the cell. On this structure, a macroscopically visible electrolytic zinc deposition takes place from the cell electrolyte only at potentials which are more negative than the potential at which deposition occurs on smooth nickel.

The auxiliary structure is galvanically separated from the anode and cathode of the cell during discharging and at the beginning of the charging process, wherein the separation can be effected by mounting spacer pieces in the cell housing, or also by means of coarse-mesh structures of a nonconducting material. A galvanic contact with one of the electrodes can only take place from the side of the zinc electrode by growth of the zinc. However, since the deposition of zinc is impossible even at a high current density, any dendrites which are formed are dissolved and, in case of a massive contacting of zinc, there occurs a large-area oxidation of the zinc under hydrogen liberation. The thus-produced hydrogen escapes rapidly, due to the coarse-pored character of the structure.

By means of an arrangement according to this invention, the charging of a zinc-nickel oxide cell is made possible, since for nickel oxide cathodes, part of the charging current is always converted for oxygen evolution and, accordingly, for cycle operation, it is necessary to adapt the degree of charging efficiency of the zinc electrode to the efficiency of the nickel oxide cathode. This adaptation is obtained, in accordance with the invention, by zinc oxidation on the auxiliary structure. For, once the zinc deposition produced during charging has reached a certain thickness on the anode, these deposits will contact the auxiliary structure — even if no intermediate or temporary dendrite formation has occurred. Any current used for charging purposes after this point in time is utilized for hydrogen evolution, so that, in accordance with a further aspect of this invention, the degree of charging efficiency of the zinc electrode can be regulated by the strength and duration of the charging current and the capacity of the zinc electrode can be regulated by the distance between the anode structure and the auxiliary structure. In this connection, it is an advantageous and essential feature that the active material of the structures be well wettable.

Preferably, the surface of the auxiliary structures contains substances or mixtures of substances usable as electro-catalysts for the hydrogen oxidation in fuel cells with an aqueous electrolyte, such as, for example, Raney nickel, finely divided platinum, tungsten carbide, or titanium-nickel alloys (e.g. 35 weight % to 85 weight % Ni). Contacting zinc is immediately oxidized by the electrolyte due to the extremely low hydrogen overvoltage of these substances. Simple nickel plates or elements of sintered nickel are not suitable for this purpose.

Preferably, there will be no macroscopically visible deposition of zinc on the auxiliary structure in case of potentials being more positive than $-1400$ millivolts with respect to a mercury oxide reference electrode.

In an advantageous embodiment of the invention, the cell is provided with a metallic net as the auxiliary structure, on which the active layer has been applied by electroless chemical or galvanic deposition. Electrophoretic or mechanical methods can also be advantageously employed for this application, wherein the thus-applied powder adheres to the structure by means of suitable binders or by a heat treatment. Furthermore, the active layer can be produced by deposition from the gaseous phase (i.e. by vapor deposition), by treatment with melts, or by etching. Suitable structures, in addition to coarse-meshed nets, perforated metal sheets, or expanded metal, include other coarse-meshed systems, such as, for example, fibrous skeletons or several layers of mesh, or open-pore foam elements.

The galvanic cell of this invention is illustrated in the accompanying drawings wherein.

Figure 1:
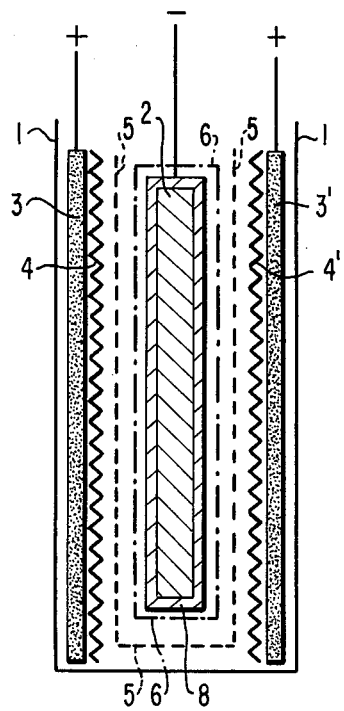
FIG. 1 shows one embodiment of a cell having one anode and two cathodes.

Normally, only one porous auxiliary structure, e.g. in the form of a net with low hydrogen overvoltage is interposed between an anode and a cathode. If an anode is surrounded on both sides by cathodes, one net or porous auxiliary structure is provided for each side. An electrical connection between the nets can e.g., be made by using a single piece of netting and giving it a U-shaped configuration as illustrated in FIG. 1. Usually not more than two nets are provided on each side of the anode, but the range of the number of conductive auxiliary structures surrounding every zinc electrode is from 1 to 4.

The thickness of the electrocatalytic coating provided on the nets or like structures is from about 0.0005 to about 0.05 mm. and the thickness of the entire auxiliary structure may vary from about 0.1 to about 1 mm.

It will be appreciated that the auxiliary structures of this invention are intended for conventional alkaline storage batteries.

The invention will be further understood from the following examples:

EXAMPLE 1

A single cell, containing as the electrolyte a saturated zincate solution in 6 M KOH, and having a zinc anode that was opposed on both sides by nickel oxide cathodes was employed. This cell contained, between the anode and the cathodes two nickel nets having a mesh width of 1 mm., on which a nickel-aluminum alloy, according to Raney, (i.e. an alloy of 30 wt. % Ni and 70 wt. % Al) had been applied by a plasma spraying unit. The nickel nets had been activated by subsequently treating the aluminum with lye (i.e. 6 M potassium hydroxide).

The cell was charged and discharged, respectively, in 45 minutes with 50 milliamperes/cm$^2$; the capacity and the degree of charging efficiency exhibited no insubstantial fluctuations over 100 cycles.

EXAMPLE 2

A zinc-nickel oxide cell of the type described in Example 1 contained, between the anode and the cathodes, two nickel nets having a mesh width of 1 mm., on which a nickel-boron alloy (i.e. an alloy of 93 wt. % Ni and 7 wt. % B) has been deposited by electroless reduction of a (1.7%) nickel chloride solution with sodium borohydride. This alloy is an x-ray amorphous, nickel boride. The cell was charged and discharged, respectively, in 45 minutes with 40 milliamperes/cm$^2$; the capacity and the degree of charging efficiency again remained essentially constant over 100 cycles.

EXAMPLE 3

A single cell as illustrated in FIG. 1 was constructed, comprising a housing 1, a flat planar zinc electrode 2 containing an admixture of 40 weight % calcium hydroxide and 1 weight % mercuric oxide, two flat planar nickel oxide electrodes 3,3' opposing both sides of the zinc electrode, two separators 4,4' consisting of coarse-mesh plastic netting, a nickel net 5 surrounding the zinc electrode on both sides, having a mesh width of 0.5 mm. and coated with tungsten carbide by plasma spraying. Interposed between net 5 and electrode 2 was a standard microporous separator 6 and a coating 8 on the zinc electrode, consisting of calcium hydroxide supported by a polyamide felt. The whole assembly was packed tightly together in the housing. The electrolyte was potassium hydroxide solution with 22 weight % KOH.

The cell was charged with 600 milliamperes for 5 hours and discharged with 1500 milliamperes; the capacity and the charging efficiency again remained highly constant over 150 cycles.

EXAMPLE 4

Figure 2:
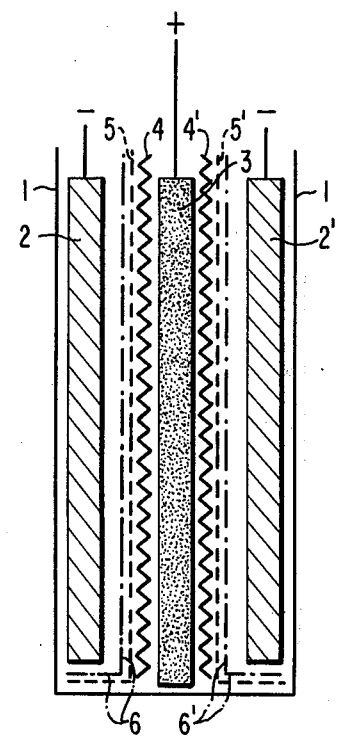
FIG. 2 shows another embodiment of the cell having two anodes and one cathode.

A single cell as illustrated in FIG. 2 was set up, comprising a housing 1; two flat planar zinc electrodes 2,2' held in grooves in the housing; two separators 4,4' of coarse nylon mesh; two catalytic nickel nets 5,5' of mesh width 1.5 mm. coated with a titanium-nickel alloy containing 50 weight % alloyed nickel surrounding the nickel oxide electrode on both sides and extending beneath the zinc electrodes; two standard microporous separators 6,6' interposed between the catalytic nets and the zinc electrodes, spaced apart from the zinc electrodes and held tightly against cell components 5,5'; 4,4' and 3 by winding several turns of polyamide sewing thread around the vertical portions. The whole packet containing components 3 to 6 was held in a groove in the housing. The electrolyte was 10 M potassium hydroxide saturated with zincate ions.

The cell was charged with 1 ampere for 5 hours and discharged with 4 amperes; again capacity and charging efficiency remained nearly constant for 100 cycles.

While the novel embodiments of the invention have been described, it will be understood that various omissions, modifications and changes in these embodiments may be made by one skilled in the art without departing from the spirit and scope of the invention.

What I claim is:

1. A galvanic cell comprising at least one rechargeable zinc anode, at least one cathode, alkaline electrolyte and at least one foraminous, wettable, electrically-conductive, coarse-pored auxiliary structure interposed between and galvanically separated from respective anodes and cathodes, said at least one auxiliary structure containing on its surface at least one electrocatalyst selected from the group consisting of Raney nickel, finely divided platinum, tungsten carbide, amorphous nickel-boron alloys and titanium-nickel alloys.

2. The galvanic cell of claim 1, in which the at least one auxiliary structure consists of a plurality of coated metallic nets.

3. The galvanic cell of claim 2, in which the metallic nets have a mesh width of about 1 mm.

4. The galvanic cell of claim 1, in which the at least one auxiliary structure comprises a plurality of auxiliary structures consisting of coated fibrous mats, non-wovens, or open-pored foam elements.

5. Galvanic cell according to claim 1, in which the zinc electrode is disposed in a pocket closed on at least one side and fashioned as an auxiliary structure.

6. The galvanic cell of claim 1, in which the at least one auxiliary structure comprises auxiliary structures of one cell that are connected conductively with one another.

7. The galvanic cell of claim 1, in which zinc compounds insoluble in the electrolyte are provided as bottom elements in the electrolyte chamber or in a mechanical connection with the zinc anode.

8. The galvanic cell of claim 1, in which the cathode is an air electrode.

9. The galvanic cell of claim 1, in which the cathode is a nickel oxide electrode.

10. The galvanic cell of claim 1, in which the at least one auxiliary structure is fixedly joined to the zinc electrode.

11. The galvanic cell of claim 1 in which the at least one auxiliary structure is fixedly joined to the cathode.

12. The galvanic cell of claim 1, in which the capacity of the zinc electrode, with a predetermined zinc concentration in the electrolyte, can be adjusted by the distance of the at least one auxiliary structure from the current discharge structure of the zinc electrode.

13. The galvanic cell of claim 1, characterized in that the degree of charging efficiency of the zinc electrode in the electrolyte which contains zinc ions is adjustable by charging duration and charging current.

14. The galvanic cell according to claim 1, wherein the openings of the at least one coarse-pored auxiliary structure are of such size that hydrogen formed at the structure is permitted to rapidly escape therethrough.

15. The galvanic cell according to claim 14, wherein a microporous separator is provided between said at least one auxiliary structure and said at least one zinc anode.

16. The galvanic cell according to claim 15, further comprising a coating of calcium hydroxide supported by a polyamide felt on said zinc anode.

17. The galvanic cell of claim 16, further comprising an additional separator provided between said at least one auxiliary structure and said at least one cathode, said additional separator comprising a coarse-mesh plastic netting.

18. The galvanic cell of claim 15, further comprising an additional separator provided between said at least one auxiliary structure and said at least one cathode, said additional separator comprising a coarse-mesh plastic netting.

19. The galvanic cell of claim 18, wherein a zinc anode is provided between a pair of nickel oxide cathodes.

20. The galvanic cell of claim 1, wherein said at least one auxiliary structure is interposed between each pair of anodes and cathodes.

21. The galvanic cell of claim 1, wherein said at least one auxiliary structure comprises 1 to 4 auxiliary structures that surround said at least one zinc anode.

22. The galvanic cell of claim 1, wherein said at least one auxiliary structure is formed from a conductive net having an electrocatalyst coating thereon, the thickness of the electrocatalyst coating being about 0.005 to about 0.05 mm.

23. The galvanic cell of claim 22, wherein the thickness of the auxiliary structure is about 0.1 to 1 mm.

24. The galvanic cell of claim 1, wherein the thickness of the auxiliary structure is about 0.1 to 1 mm.

25. A galvanic cell comprising at least one rechargeable zinc anode, at least one cathode, alkaline aqueous electrolyte, and at least one foraminous, wettable, electrically conductive, coarse-pored auxiliary structure interposed between and galvanically separated from respective anodes and cathodes, said at least one auxiliary structure containing on its surface at least one to metal-containing electrocatalyst that has such low hydrogen overvoltage that there is no visible zinc deposition on said auxiliary structure during charging and discharging at a current density of at least 40 milliamperes/$cm^2$ whereby contacting zinc is oxidized and dissolved in the electrolyte and whereby hydrogen is generated during the oxidation, said hydrogen escaping from the at least one coarse-pored auxiliary structure.

26. The galvanic cell according to claim 25, wherein the openings of the coarse-pored at least one auxiliary structure are of such size that hydrogen formed at the structure is permitted to rapidly escape therefrom.

27. The galvanic cell according to claim 26, wherein a microporous separator is provided between said at least one auxiliary structure and said at least one zinc anode.

28. The galvanic cell according to claim 27, wherein said microporous separator is a polyamide felt.

29. The galvanic cell of claim 27, further comprising an additional separator provided between said at least one auxiliary structure and said at least one cathode, said additional separator comprising a coarse-mesh plastic netting.

30. The galvanic cell of claim 29, wherein a zinc anode is provided between a pair of nickel oxide cathodes.

31. The galvanic cell of claim 25, wherein said at least one auxiliary structure is interposed between each pair of anodes and cathodes.

32. The galvanic cell of claim 25, wherein said at least one auxiliary structure surrounds said at least one zinc anode.

33. The galvanic cell of claim 25, wherein said at least one auxiliary structure is formed from a conductive net having said electrocatalyst coating thereon, the thickness of the electrocatalyst coating being about 0.005 to about 0.05 mm.

34. The galvanic cell of claim 33, wherein the thickness of the auxiliary structure is about 0.1 to 1 mm.

* * * * *